Figure 1:
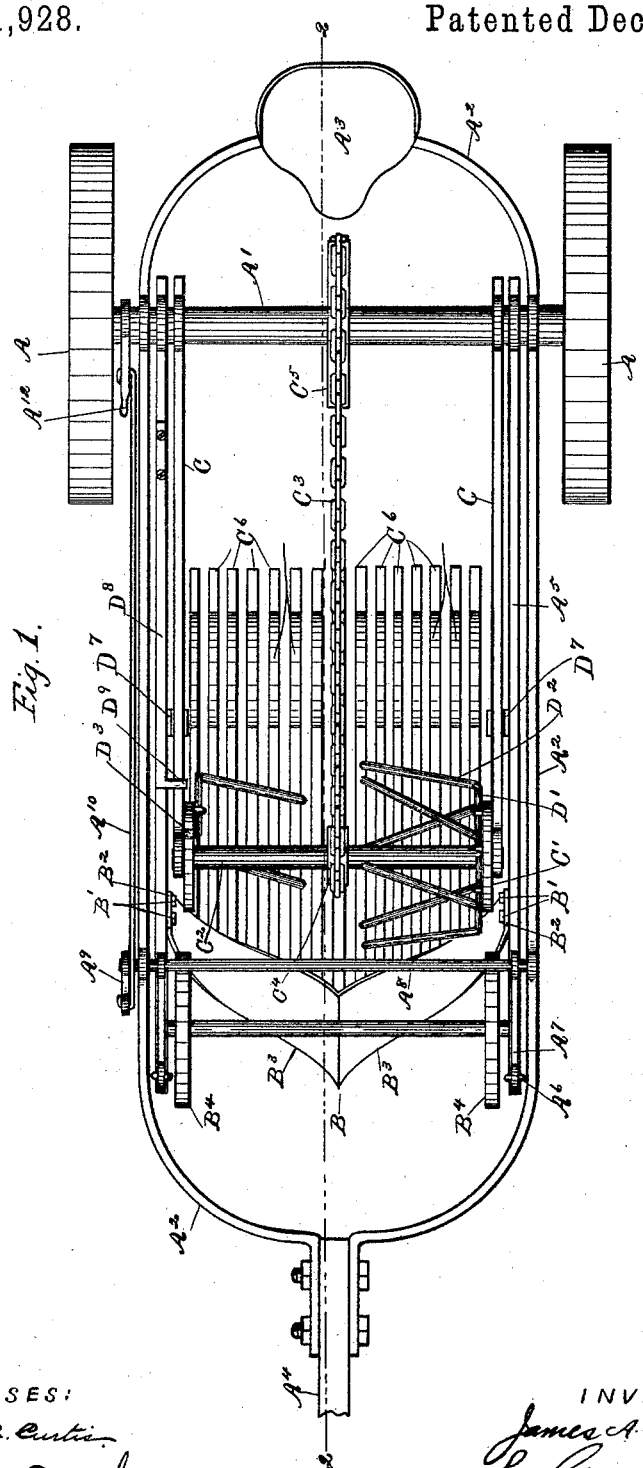

(No Model.) 2 Sheets—Sheet 1.

J. A. BUCK.
POTATO DIGGER.

No. 441,928. Patented Dec. 2, 1890.

WITNESSES:
Frank C. Curtis
John T. Booth

INVENTOR:
James A. Buck
by Geo. A. Mosher
atty.

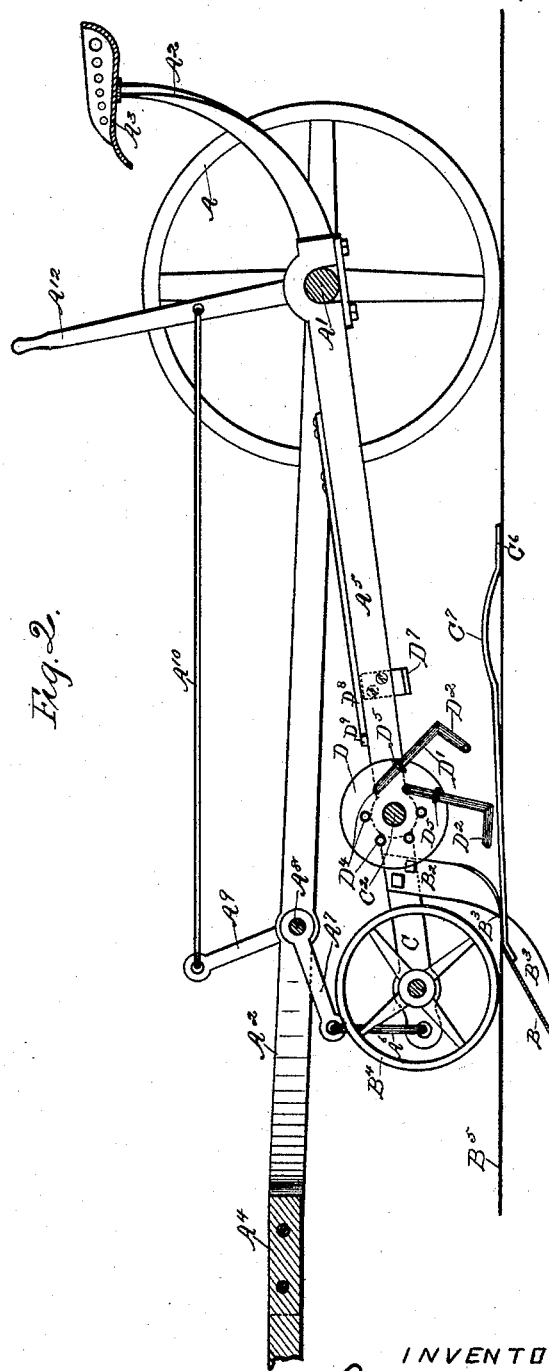

UNITED STATES PATENT OFFICE.

JAMES A. BUCK, OF CRESCENT, NEW YORK.

POTATO-DIGGER.

SPECIFICATION forming part of Letters Patent No. 441,928, dated December 2, 1890.

Application filed April 8, 1890. Serial No. 347,118. (No model.)

*To all whom it may concern:*

Be it known that I, JAMES A. BUCK, a citizen of the United States, residing at Crescent, county of Saratoga, and State of New York, have invented certain new and useful Improvements in Potato-Diggers, of which the following is a specification.

My invention relates to such improvements; and it consists of the novel construction and combination of parts hereinafter described, and subsequently claimed.

Reference may be had to the accompanying drawings and the letters of reference marked thereon, which form a part of this specification.

Similar letters refer to similar parts in the several figures therein.

Figure 1 of the drawings is a top plan view of my improved potato-digger. Fig. 2 is a vertical longitudinal section of the same, taken on the broken line 2 2 in Fig. 1.

The plow-truck consists of traction drive-wheels A, fixed on axle A', pole and seat-frame $A^2$, seat $A^3$, and pole $A^4$, shown in part only.

The plow-frame consists of two parallel bars $A^5$, pivoted at their rear ends upon the axle and connected by links $A^6$ at their forward ends each to an arm $A^7$ of the rock-shaft $A^8$. The rock-shaft is supported in suitable bearings by the truck-frame, and has an actuating rock-lever $A^9$, connected by rod $A^{10}$ with an operating hand-lever $A^{12}$, pivoted upon the axle, as shown.

The two-share plow B is secured on opposite sides to the plow-frame, as by bolts or rivets B' passing through the upright extensions $B^2$ of the plowshares $B^3$ and the frame-bars near their forward ends, whereby the operator sitting in the seat can adjust the height of the plow by means of the hand-lever and the connecting parts above described. The plow-frame is also provided with the supporting-wheels $B^4$, which run upon the ground (represented by the line $B^5$) and regulate the penetrating depth of the plow when not controlled by the operator through the hand-lever. Another frame consisting of the parallel bars C, pivoted at their rear ends upon the axle, supports at its forward end a pair of clearing-wheels C', fixed upon a shaft $C^2$, rotary in suitable bearings on the supporting-frame. A rotary movement is communicated to the clearing-wheel shaft by means of a sprocket-chain $C^3$ and sprocket-wheels $C^4$ and $C^5$, the latter and larger wheel being fixed upon the driving-axle and the former upon the wheel-shaft $C^2$.

The clearing-wheels are preferably located over and a little to the rear of the plowshares and serve to clear away from the plow the earth, potatoes, and vines thrown up by the shares and prevent such material from clogging and adhering to the plow, also to force the potatoes back upon the separating-fingers, which consist of a series of rods $C^6$, secured to the plowshares and extending backward toward the axle in lines parallel with each other and with the line of direction in which the machine is to be moved. The several fingers are preferably provided near their rear ends with an upwardly-curved portion $C^7$, and serve to separate the potatoes from the dirt and leave them on top.

Each of the clearing-wheels consists of a hub D, fixed upon shaft $C^2$, and a plurality of spokes D', secured to the hubs in an approximately radial position, the projecting ends of the spokes being each provided with an arm $D^2$, projecting transversely across the wake of the plow, as shown, preferably in a direction slightly angular to the line of their supporting-shaft, and so inclined that the arms as they pass around the lower side in contact with the material loosened by the plow will incline forward and present to the material working-inclines which descend toward the central longitudinal line of the machine and tend to throw the potatoes toward the central space between the wheels to leave them uninjured in a compact row behind the machine.

The spokes and arms are each preferably made of a single piece of heavy round wire, and may be attached to the hubs by inserting a right-angular shank (shown by dotted lines $D^3$ in Fig. 1) on one end of the spoke through an aperture $D^4$ in the hub, and securing the spoke upon the inner face of the hub by a staple $D^5$ driven into the hub, as shown in Fig. 2. I have shown one of the hubs with only two spokes, four being removed. It is obvious that any desired number of spokes and arms may be employed and that the transversely-extended arms moving laterally through the material thrown up by the plow will not injure the potatoes as they would do if given a longitudinal movement through the loosened material.

The plow-frame bars are each provided with hook $D^7$, which projects inwardly beneath the clearing-wheel frame to engage with the latter when the plow-frame is raised, whereby both the plow and wheel frames can be raised at the same time to lift the plow and wheels from the ground in passing an obstruction or from one field to another.

When desired, a spring $D^8$ may be fixed at one end upon the plow-frame and have the other end $D^9$ project laterally to engage the clearing-wheel frame and assist the weight of the wheels in causing the arms $D^2$ to penetrate the loosened material.

What I claim as new, and desire to secure by Letters Patent, is—

1. In a potato-digger, the combination, with a traction-wheel plow-truck, of a plow, plow-frame pivoted upon the truck-axle, sprocket-wheels fixed, respectively, upon the wheel-shaft and truck-axle, sprocket-wheel connecting-chain, and a spring $D^8$, secured to the plow-frame and having its free end engaged with the clearing-wheel frame, whereby said wheel is held to its work by the plow in a yielding manner, substantially as set forth.

2. In a potato-digger, the combination, with a traction-wheel plow-truck, of a plow, plow-frame pivoted upon the truck-axle, a clearing-wheel, clearing-wheel frame pivoted upon the truck-axle, driving mechanism, substantially as described, connecting the wheel-shaft and truck-axle, a hook $D^7$, fixed upon the plow-frame to engage the clearing-wheel frame, a rock-shaft supported by the truck-frame immediately over the plow and plow-supporting wheel and provided with a rock-lever and arm, a hand-lever fulcrumed upon the truck, and connections for connecting the rock lever with the hand-lever and an arm upon the rock-shaft with the extreme front end of the plow-frame, substantially as described.

3. In a potato-digger having a traction-wheel plow-truck, the combination, with a clearing-wheel frame, of a clearing-wheel consisting of a hub fixed upon a rotary shaft and a series of spokes radiating from such hub and severally provided at their projecting ends with an arm projecting laterally from the vertical plane of the hub and transversely of the truck-frame, and wheel-driving mechanism, substantially as described, connecting the wheel-shaft and truck-axle, substantially as described.

4. In a potato-digger having a traction-wheel plow-truck, the combination, with a clearing-wheel frame, of a pair of clearing-wheels, each consisting of a pair of hubs respectively fixed upon and near the ends of the same rotary shaft, each hub having a series of spokes radiating from such hub and severally provided at their projecting ends with an arm projecting laterally from the vertical plane of the hub and transversely of the truck-frame toward the opposite hub and in a direction angular to the line of the hub-supporting shaft, and means, substantially as described, for imparting rotary movements to the wheels, substantially as described.

In testimony whereof I have hereunto set my hand this 31st day of March, 1890.

JAMES A. BUCK.

Witnesses:
GEO. A. MOSHER,
W. H. HOLLISTER, Jr.